United States Patent
Van Zanten et al.

(10) Patent No.: US 9,528,044 B2
(45) Date of Patent: Dec. 27, 2016

(54) METHODS USING STIMULATION-CAPABLE DRILL-IN AND COMPLETION FLUIDS

(71) Applicants: Ryan Van Zanten, Houston, TX (US); Abdalla Moustafa Ezzat, Houston, TX (US)

(72) Inventors: Ryan Van Zanten, Houston, TX (US); Abdalla Moustafa Ezzat, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 123 days.

(21) Appl. No.: 13/733,927

(22) Filed: Jan. 4, 2013

(65) Prior Publication Data

US 2014/0190695 A1  Jul. 10, 2014

(51) Int. Cl.
 *C09K 8/88* (2006.01)
 *E21B 43/00* (2006.01)
 *C09K 8/12* (2006.01)
 *C09K 8/508* (2006.01)

(52) U.S. Cl.
 CPC . *C09K 8/88* (2013.01); *C09K 8/12* (2013.01); *C09K 8/508* (2013.01); *E21B 43/00* (2013.01)

(58) Field of Classification Search
 None
 See application file for complete search history.

(56) References Cited

U.S. PATENT DOCUMENTS

| | | | |
|---|---|---|---|
| 6,110,875 A * | 8/2000 | Tjon-Joe-Pin et al. | 507/201 |
| 7,131,493 B2 | 11/2006 | Eoff et al. | |
| 7,134,496 B2 | 11/2006 | Jones et al. | |
| 7,265,079 B2 * | 9/2007 | Willberg et al. | 507/203 |
| 7,380,606 B2 | 6/2008 | Pursley et al. | |
| 8,148,303 B2 * | 4/2012 | Van Zanten et al. | 507/103 |
| 2003/0106690 A1 | 6/2003 | Boney et al. | |
| 2003/0119680 A1 * | 6/2003 | Chang | C09K 8/68 507/200 |
| 2003/0166472 A1 * | 9/2003 | Pursley et al. | 507/200 |
| 2004/0106525 A1 * | 6/2004 | Willberg et al. | 507/200 |
| 2005/0252659 A1 | 11/2005 | Sullivan et al. | |
| 2006/0016596 A1 | 1/2006 | Pauls et al. | |
| 2006/0073986 A1 | 4/2006 | Jones et al. | |
| 2006/0254774 A1 | 11/2006 | Saini et al. | |
| 2006/0258541 A1 * | 11/2006 | Crews | 507/203 |
| 2007/0027253 A1 | 2/2007 | Jones et al. | |
| 2008/0070805 A1 * | 3/2008 | Munoz et al. | 507/110 |
| 2008/0070808 A1 * | 3/2008 | Munoz et al. | 507/117 |
| 2008/0076682 A1 | 3/2008 | Jones et al. | |
| 2008/0110618 A1 * | 5/2008 | Quintero et al. | 166/278 |
| 2008/0139410 A1 * | 6/2008 | Chen | C09K 8/602 507/204 |
| 2008/0287324 A1 * | 11/2008 | Pursley | C09K 8/52 507/218 |
| 2009/0038800 A1 | 2/2009 | Ravi et al. | |
| 2011/0005773 A1 * | 1/2011 | Dusterhoft et al. | 166/376 |
| 2011/0186293 A1 | 8/2011 | Gurmen et al. | |

FOREIGN PATENT DOCUMENTS

| | | |
|---|---|---|
| WO | WO0142387 A1 | 6/2001 |
| WO | WO2006029019 A2 | 3/2006 |
| WO | WO2008045734 A2 | 4/2008 |
| WO | 2011092637 A2 | 8/2011 |
| WO | 2014107391 A1 | 7/2014 |

OTHER PUBLICATIONS

International Search Report and Written Opinion for PCT/US2013/077788 dated Apr. 21, 2014.
Office Action received in corresponding Canadian Application No. 2,889,708 dated Mar. 31, 2016.
Office Action received in corresponding Australian Application No. 2013371394 dated May 24, 2016.
Supplementary European Search Report received in EP Application 13870124, dated Aug. 10, 2016.

* cited by examiner

*Primary Examiner* — Angela M DiTrani
*Assistant Examiner* — Anuradha Ahuja
(74) *Attorney, Agent, or Firm* — McDermott Will & Emery LLP; Tenley Krueger

(57) ABSTRACT

Methods comprising providing a drill-in fluid including an aqueous carrier fluid, a surfactant; and a self-degradable filter cake-forming agent which includes a plurality of degradable particulates which are operable to form an acid upon degradation, and a plurality of acid-degradable particulates. Drilling a wellbore through a reservoir section of a subterranean formation with the drill-in fluid, forming a thin internal filter cake within the wellbore from the self-degradable filter cake-forming agent. Releasing an acid derivative from at least a portion of the plurality of degradable particulates, interacting the acid with the filter cake so as to at least partially degrade the acid-degradable particulates therein. Thereby at least partially removing the filter cake allowing quick lift off of the remaining particulates, and producing a hydrocarbon fluid or gas from the subterranean formation.

16 Claims, No Drawings

METHODS USING STIMULATION-CAPABLE DRILL-IN AND COMPLETION FLUIDS

BACKGROUND

The present invention relates to fluids employed in subterranean operations, and more particularly to fluids with formation stimulation capability and methods of their use during drill-in and completion operations.

Drill-in fluids are specially designed for drilling through a subsurface hydrocarbon reservoir portion of a wellbore. Such fluids are generally formulated to minimize formation damage and maximize production of the zones exposed by the drilling. Formation damage can occur through many different mechanisms including, for example, emulsion blocks, water blocks, polymer/filtrate/particle invasion, precipitates, improper wetting of the formation, and the like. The damage may be remediated by stimulating the formation in the form of fracturing, acidizing or improving flowback with chemical treatments. Many drill-in fluids are aqueous-based to reduce formation damage such as oil-wetting and/or emulsion blockages in the formation. Drill-in fluids may be specifically formulated as brines containing solids, such as calcium carbonate, of appropriate particle size and may contain various polymers along with the penetrated rock fragments generated by the drill bit. Few additives beyond those for filtration control and carrying cuttings, however, are typically present in a drill-in fluid. Similar fluids may be employed during well completion operations. Indeed, drill-in fluids and completion fluids with or without solids are typically similar in design.

Completion fluids are designed to facilitate final operations prior to initiation of production, such as setting screen production liners, packers, downhole valves or shooting perforations into the producing zone. The fluid is generally designed to control a well in the event of downhole hardware failure, without damaging the formation or completion components. Completion fluids, like drill-in fluids are typically brines (e.g., chlorides, bromides and formates), although any fluid of proper density and flow characteristics may be employed. The fluids are typically selected to be chemically compatible with the formation and formation fluids, and are frequently filtered prior to use to avoid introducing undesirable or non-degradable solids at the near-wellbore area.

Stimulation treatment to improve oil and/or gas recovery and well producibility is typically performed after drill-in operations and/or after performing well completion operations in a target reservoir section of the formation. Such stimulation treatments may include fracturing, acidizing, or other chemical treatments to improve connectivity to the wellbore. Because they occur as separate operations after drill-in and/or completion operations, stimulation treatments require special equipment, can be expensive, and delay the time for the well to come online.

SUMMARY OF THE INVENTION

The present invention relates to fluids employed in subterranean operations, and more particularly to fluids with formation stimulation capability and methods of their use during drill-in and completion operations.

In some embodiments, the present invention provides methods comprising providing drill-in fluids comprising an aqueous fluid, surfactants, and self-degradable filter cake-forming agents, the self-degradable filter cake-forming agents comprising a plurality of degradable particulates, the plurality of degradable particulates being operable to form acid upon degradation, and a plurality of acid-degradable particulates, the method further comprising drilling wellbores through reservoir sections of subterranean formations with the drill-in fluids, forming thin internal filter cakes within the wellbores from the self-degradable filter cake-forming agents, providing acid derivatives from at least a portion of the plurality of degradable particulates, allowing the acid generated in-situ to interact with the filter cake so as to at least partially degrade the filter cake and any acid soluble drilled rock minerals, thereby at least partially removing the filter cake and some of the crushed rock fragments allowing quick clean-up of the remaining particulates, and producing hydrocarbon fluids or gas from the subterranean formations.

In other embodiments, the present invention provides methods comprising providing completion fluids comprising aqueous carrier fluids, surfactants, and self-degradable fluid sealing agents, the self-degradable fluid sealing agents comprising a plurality of degradable particulates, the plurality of degradable particulates being operable to release acid upon degradation, and a plurality of sized acid-degradable particulates, the methods further comprising introducing the completion fluids into uncompleted wellbores penetrating subterranean formations or perforations through cased wellbores into the formations, forming fluid seals within the uncompleted wellbores from the self-degradable fluid sealing agents, performing completion operations in the uncompleted wellbores, providing acid from at least a portion of the plurality of degradable particulates, allowing the acid to interact with the fluid seals so as to at least partially degrade the acid-degradable particulates therein, thereby at least partially removing the fluid seals, and easily producing hydrocarbon fluids and/or gas from the subterranean formations.

The features and advantages of the present invention will be readily apparent to those skilled in the art upon a reading of the description of the invention that follows.

DETAILED DESCRIPTION

The present invention relates to fluids employed in subterranean operations, and more particularly to fluids with formation stimulation capability and methods of their use during drill-in and completion operations.

Among the numerous advantages, the present invention provides drill-in and completion fluids that may reduce or eliminate the need for applying special stimulation treatments after drill-in and/or completion operations which, in turn may reduce costs and minimize the time until a well can come into production. Methods of the invention employing the drill-in and completion fluids comprising surfactants and self-degrading particles disclosed herein may improve formation permeability and lead to enhanced hydrocarbon recovery and well production rates, while at the same time minimizing damage to the formation.

Methods of the invention may provide stimulation of the reservoir during completion or drill-in operations at low surfactant loadings, while also removing the need for supplemental acidizing treatments. That is, the self-degrading particles disclosed herein may provide an in situ acid source obviating the need for separate acidizing operations. Thus, as used herein, "stimulation" refers to this in situ acidization process performed in the presence of low surfactant loading. Such stimulation may be performed absent further fracturing. In addition to avoiding a separate acidizing treatment, methods of the invention further may be performed in the absence of organic solvents, which can help avoid formation damage. Moreover, it has been indicated that the fluids employed in methods disclosed herein readily water wet the formation, which can provide enhanced hydrocarbon production while simultaneously protecting the formation from damage due to oil wetting. The fluids employed in methods of the invention may also inhibit paraffin and asphaltene deposition.

Fluids employed in drill-in and completion methods disclosed herein may be fully self-remediating and stimulating fluid loss pills. As used herein, "self-remediating" refers to the ability of the self-degradable filter cake-forming agent employed in treatment fluids disclosed herein to self-degrade facilitating clean without the need for introducing exogenous agents to break up the filter cake. As used herein "stimulating fluid loss pill" refers to a fluid loss pill comprising such a self-degradable filter cake-forming agent. The self-degrading particles in such fluid loss pills may clean up the filter cake by generating organic acids in situ that can dissolve acid degradable particulates such as calcium carbonate, starch, and other biopolymers employed in fluid loss pill formulations. Without being bound by theory, it has been indicated that the surfactants employed in fluids formulated as fluid loss pills may also reduce or eliminate formation damage induced by drilling in the reservoir by minimizing emulsion and/or water blocks and water wetting the near wellbore area. The presence of self-degrading particulates that provide an in situ acid source may assist in remediation of the filter cake without having to spot a breaker.

Methods of the invention may employ self remediating drill-in fluids that can carry water insoluble components such as oil-soluble lubricants. Other additives that may be added include, for example, corrosion inhibitors and rate of penetration (ROP) enhancers. Any of these additives may be used in methods disclosed herein while minimizing risk to the formation, in contrast with convention drill-in operations. Other advantages will be apparent to those skilled in the art.

In some embodiments, the present invention provides methods comprising providing drill-in fluids comprising aqueous carrier fluids, surfactants, and a self-degradable filter cake-forming agent, the self-degradable filter cake-forming agent comprising a plurality of degradable particulates, the plurality of degradable particulates being operable to form an acid upon degradation, and a plurality of acid-degradable particulates, the method further comprising drilling a wellbore through a reservoir section of a subterranean formation with the drill-in fluid, forming a thin internal filter cake within the wellbore from the self-degradable filter cake-forming agent, releasing an acid derivative from at least a portion of the plurality of degradable particulates, interacting the acid with the filter cake so as to at least partially degrade the acid-degradable particulates therein, thereby at least partially removing the filter cake allowing quick lift off of the remaining particulates, and producing a hydrocarbon fluid or gas from the subterranean formation.

In some embodiments, the present invention provides methods comprising providing completion fluids comprising aqueous carrier fluids, surfactants, and self-degradable fluid sealing agents, the self-degradable fluid sealing agents comprising a plurality of degradable particulates, the plurality of degradable particulates being operable to release acid upon degradation, and a plurality of sized acid-degradable particulates, the methods further comprising introducing the completion fluids into uncompleted wellbores penetrating subterranean formations or perforations through cased wellbores into the formations, forming fluid seals within the uncompleted wellbores from the self-degradable fluid sealing agents, performing completion operations in the uncompleted wellbores, releasing acid from at least a portion of the plurality of degradable particulates, interacting the acid with the fluid seals so as to at least partially degrade the acid-degradable particulates therein, thereby at least partially removing the fluid seals, and easily producing a hydrocarbon fluid and/or gas from the subterranean formation.

Aqueous carrier fluids suitable for use in the drill-in or completion fluids of the present invention may comprise fresh water, saltwater (e.g., water containing one or more salts dissolved therein), brine (e.g., saturated salt water), seawater, or combinations thereof. Generally, the water may be from any source, provided that it does not contain components that might adversely affect the stability and/or performance of the drill-in fluids of the present invention. In certain embodiments, the density of the aqueous base fluid can be adjusted, among other purposes, to provide additional particulate transport and suspension in the treatment fluids used in the methods of the present invention. In certain embodiments, the pH of the aqueous base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate. In some embodiments, the pH range may preferably be from about 4 to about 11.

In some embodiments, aqueous carrier fluids suitable for use in conjunction with the drill-in fluids described herein may include, but are not limited to, aqueous fluid, aqueous-miscible fluids, and any combination thereof. Aqueous fluids may, in some embodiments, include, but are not limited to, fresh water, saltwater (e.g., water containing one or more salts dissolved therein), brine (e.g., saturated salt water), seawater, and any combination thereof. Suitable aqueous-miscible fluids may, in some embodiments, include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous fluid described above, and any combination thereof.

Foam drilling is sometimes preferred for drilling low pressure or depleted reservoirs to avoid lost circulation, which may cause severe formation damage. Foam Drilling is especially suitable for drilling large holes in formations that are prone to lost circulation. Foam is generated at the surface by mixing air from compressors with a foaming solution from a mist pump. Thus, in some embodiments, the drill-in or completion fluids for use in conjunction with the present invention may be foamed. As used herein the term foam refers to a two-phase composition having a continuous liquid phase and a discontinuous gas phase. In some embodiments, drill-in or completion fluids for use in conjunction with methods of the present invention may comprise an aqueous carrier fluid, a gas, and a foaming agent.

Suitable gases for use in conjunction with the present invention may include, but are not limited to, nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant transport capability, up to about 12 lb of proppant per gal of fracture fluid.

In some embodiments, the quality (i.e., the degree of foaming) of the foamed drill-in or completion fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

Suitable foaming agents for use in conjunction with the present invention may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quarternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

In some embodiments drill-in and completion fluids employed in methods of the invention comprise a surfactant that promotes microemulsion formation. Current chemical stimulation treatments are applied by intervention after the well has been drilled and such treatments generally comprise a mixture of surfactants and solvents. By contrast, the drill-in and completion fluids disclosed herein may specifically lack conventional organic solvents employed in such stimulation treatments. The fluids disclosed herein may demonstrate increased production relative to the formulations containing organic solvents. The surfactant only system may provide microemulsions in situ upon with hydrocarbons and may water wet the reservoir pores and surfaces of its flow channels. As organic solvent free fluids, the drill-in and completion fluids employed in methods disclosed herein are more environmentally friendly compared to stimulation interventions that include organic solvents. Moreover, organic solvents may lead to unwanted wettability alteration by displacing surfactants at some interfaces.

Surfactants have been used as stimulation and/or enhanced oil recovery additives. The amphiphilic nature of the surfactant molecule allows it to position itself at the interface between different phases (e.g., liquid/liquid, gas/liquid, solid/liquid, etc.). This may lead to a reduction of surface tension between liquid/liquid and gas/liquid interfaces or a change in wettability between liquid/solid interfaces. The reduction in surface tension at the liquid/liquid interface may allow flow with a lower pressure drop across the length of the porous media, thus making the fluid move more easily. The alteration in wettability allows the wetting fluid to spread along the solid interface leaving more open cross-section to flow of the non-wetting fluid. In two-phase flow in porous media, non-wetting fluid may flow easier as it tends to aggregate in the larger pore spaces. The smaller pore spaces are filled with the wetting fluid and capillary forces may cause a block to be formed, but these pores contribute very little to the overall flow.

Emulsion blockages formed from oil-in-water or water-in-oil emulsions, can severely reduce the permeability and productivity of the reservoir. This may be because emulsions can create very high viscosity fluids due to droplet-droplet interactions. The addition of certain surfactants may also act to break up oil/water emulsions by micellizing or microemulsifying the oil, leading to a lower viscosity solution, thus a higher production rate. Water blocks are more detrimental in gas wells, due to the much lower viscosity of the gas than the liquid. This causes liquid to build up leading to lower production. Treatment with a water wetting surfactant will cause the water to spread on the solid interface leading to higher production of gas.

In some embodiments, methods of the invention employ surfactants that comprise microemulsion-forming surfactants to remove emulsions and water wet the wellbore area. Surfactants exhibiting microemulsion phase behavior may readily disperse hydrocarbons and water wet with little to no energy input, making them ideal for stimulation treatments. The drill-in and completion fluids of the present invention can comprise one or more surfactants. In general, a surfactant can include any surfactant capable of forming a micelle alone or in combination with a co-surfactant. In some embodiments, a combination of different surfactant and other chemical additives can be used as stimulation while drilling additives. Surfactants suitable for use with the drilling fluids of the present invention include, but are not limited to, non-ionic, anionic, cationic and amphoteric surfactants, any derivatives thereof, and any combination thereof. Exemplary surfactants employed in the drill-in and completion methods disclosed herein may comprise at least one selected from the group consisting of arginine methyl esters, alkanolamines, alkylenediamides, alkyl ester sulfonates, alkyl ether sulfonates, alkyl ether sulfates, alkali metal alkyl sulfates, alkyl or alkylaryl sulfonates, sulfosuccinates, alkyl or alkylaryl disulfonates, alkyl disulfates, alcohol polypropoxylated and/or polyethoxylated sulfates, taurates, amine oxides, alkylamine oxides, ethoxylated amides, alkoxylated fatty acids, alkoxylated alcohols, ethoxylated fatty amines, ethoxylated alkyl amines, betaines, modified betaines, alkylamindobetaines, quaternary ammonium compounds, alkyl propoxy-ethoxysulfonate, alkyl propoxy-ethoxysulfate, alkylaryl-propoxyethoxysulfonate, methyl ester sulfonate; a hydrolyzed keratin; a mixture of an ammonium salt of an alkyl ether sulfate; a cocoamidopropyl betaine surfactant; a cocoamidopropyl dimethylamine oxide surfactant, and sodium chloride; a mixture of an ethoxylated alcohol ether sulfate surfactant, an alkyl or alkene amidopropyl betaine surfactant, and an alkyl or alkene dimethylamine oxide surfactant; a mixture of an alpha-olefinic sulfonate surfactant and a betaine surfactant; any derivative thereof and any combination thereof.

Suitable non-ionic surfactants include, but are not limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both, any derivative thereof, or any combination thereof. The term "derivative," as used herein refers to any compound that is made from one of the identified compounds, for example, by replacing one atom in the listed compound with another atom or group of atoms, or rearranging two or more atoms in the listed compound. Suitable cationic surfactants include, but are not necessarily limited to, arginine methyl esters, alkanolamines, alkylenediamides, alkyl ester sulfonates, alkyl ether sulfonates, alkyl ether sulfates, alkali metal alkyl sulfates, alkyl or alkylaryl sulfonates, sulfosuccinates, alkyl or alkylaryl disulfonates, alkyl disulfates, alcohol polypropoxylated and/or polyethoxylated sulfates, taurates, amine oxides, alkylamine oxides, ethoxylated amides, alkoxylated fatty acids, alkoxylated alcohols, ethoxylated fatty amines, ethoxylated alkyl amines, betaines, modified betaines, alkylamidobetaines, quaternary ammonium compounds, any derivative thereof, and any combination thereof. Specific surfactants may include, but are not limited to, methyl ester sulfonate, a hydrolyzed keratin, polyoxyethylene sorbitan monopalmitate, polyoxyethylene sorbitan monostearate, polyoxyethylene sorbitan monooleate, linear alcohol alkoxylates, alkyl ether sulfates, dodecylbenzene sulfonic acid, linear nonyl-phenols, dioxane, ethylene oxide, polyethylene glycol, ethoxylated castor oils, dipalmitoyl-phosphatidylcholine, sodium 4-(1' heptylnonyl) benzenesulfonate, polyoxyethylene nonyl phenyl ether, sodium dioctyl sulphosuccinate, tetraethyleneglycoldodecylether, sodium octylbenzenesulfonate, sodium hexadecyl sulfate, sodium laureth sulfate, ethylene oxide, decylamine oxide, dodecylamine betaine, dodecylamine oxide, any derivative thereof, or any combination thereof. Other suitable surfactants may include alkyl propoxy-ethoxysulfonate, alkyl propoxy-ethoxysulfate, alkylaryl-propoxy-ethoxysulfonate, a mixture of an ammonium salt of an alkyl ether sulfate; a cocoamidopropyl betaine surfactant; a cocoamidopropyl dimethylamine oxide surfactant, and sodium chloride; a mixture of an ethoxylated alcohol ether sulfate surfactant, an alkyl or alkene amidopropyl betaine surfactant, and an alkyl or alkene dimethylamine oxide surfactant; a mixture of an alpha-olefinic sulfonate surfactant and a betaine surfactant; any derivative thereof; and any combination thereof.

Suitable surfactants may also include polymeric surfactants, block copolymer surfactants, di-block polymer surfactants, hydrophobically modified surfactants, fluoro-surfactants, and surfactants containing a non-ionic spacer-arm central extension and an ionic or nonionic polar group. The non-ionic spacer-arm central extension may be the result of polypropoxylation, polyethoxylation, or a mixture of the two, in non-limiting embodiments.

The amount of surfactant included in the drill-in or completion fluid may be based on a number of factors including, but not limited to, the type of aqueous fluid, the temperature of the formation, the particular surfactant or surfactant blend used, and the type of optional additives included. In an embodiment, the surfactant may be present in the drill-in or completion fluid in an amount in a range from a lower limit from about 0.01% to about 1% to an upper limit from about 15% to about 20% by weight of the drill-in or completion fluid.

In an embodiment, a drill-in or completion fluid may comprise a co-surfactant. As used herein, a "co-surfactant" refers to a compound that participates in aggregation of molecules into a micelle but does not aggregate on its own. Suitable co-surfactants useful with the drill-in or completion fluids of the present invention include, but are not limited to, alcohols, glycols, phenols, thiols, carboxylates, sulfonates, pyrollidones, any derivative thereof, and any combination thereof. In some embodiments, an alcohol useful as a co-surfactant may have from about 3 to about 10 carbon atoms. In some embodiments, suitable alcohols can include, but are not limited to, t-butanol, n-butanol, n-pentanol, n-hexanol, 2-ethyl-hexanol, propanol, and sec-butanol. Suitable glycols can include, but are not limited to, ethylene glycol, polyethylene glycol, propylene glycols, and triethylene glycol. In some embodiments, a co-surfactant may be included in the drilling fluids of the present invention in an amount ranging from about 0.001% to about 20% by weight of the drilling fluid.

In some embodiments, methods of the invention employ self-degradable filter cake-forming agents comprising a plurality of degradable particulates, the plurality of degradable particulates being operable to form an acid upon degradation. The filter cake may be formed by aggregation of these degradable particulates and may provide, for example, fluid loss prevention and/or fluid diversion. The filter cake self-degrades by way of the self-degrading particulates that make up the filter cake. In some embodiments, self-degradation may occur naturally over time, while in other embodiments self-degradation may be catalyzed, for example, by supplying a change in pH, temperature, or combinations thereof. In some such embodiments, the plurality of degradable particulates may comprise an acid-generating substance selected from the group consisting of a polyester, a polylactide, a polyglycolide, a poly($\epsilon$-caprolactone), a polyanhydride, a poly(orthoester), a poly(amino acid), and any combination thereof. In particular embodiments, the plurality of degradable particulates comprises poly (lactic acid). As used herein "degradable" when used in connection with the plurality of degradable particulates means that the conditions downhole, either inherent or modified externally by an operator by supplying heat, a catalyst, or both, can cause the breakdown of the polymeric units that make up the filter cake-forming agents, thereby liberating an organic acid. In some embodiments, the filter cake-forming agents takes the form of a fluid loss pill. In some embodiments, methods of the invention employ drill-in fluid or completion fluids comprising about 1 wt. % to about 10 wt. % of the plurality of degradable particulates. One skilled in the art will recognize that the exact selection may depend on, for example, the reservoir rocks mineralogy and morphology, such as the rock pore geometry. In some embodiments, the drill-in fluid or completion fluids comprise about 1 wt. % and about 25 wt. % of the plurality of acid-releasing degradable particulates. In some embodiments, the drill-in fluid or completion fluids comprise about 1 wt. % to about 10 wt. % of the plurality of acid-releasing degradable particulates.

In some embodiments, the liberated organic acid may be used to degrade further elements introduced by way of the drill-in or completion fluid. For example, in some embodiments, the in-situ generated organic acid may be used to break down calcium carbonate, starches, and other biopolymers that may be present on surfaces of the formation or neighboring tools. In particular embodiments, the plurality of acid-degradable particulates comprises calcium carbonate particulates. As an example, the liberated acid may be used to breakdown bridging particles of sized calcium carbonate.

In some embodiments, methods of the invention employing drill-in fluids disclosed herein may comprise drilling a wellbore comprising a multi-lateral wellbore system. A multi-lateral well is a single well with one or more wellbore branches radiating from the main borehole. As used herein, "multi-lateral wellbore" includes, without limitation, systems that have main boreholes that are vertical, horizontal, or extended reach. Multi-lateral configurations include, without limitation, multi-branched wells, forked wells, wells with several laterals branching from a horizontal main wellbore, or several laterals branching from a vertical main wellbore. In vertical systems, the laterals may be stacked. Laterals may also be dual-opposing. In some such embodiments, the self-degrading filter cake may help achieve effective clean up of several laterals drilled in the same well without further intervention for stimulation treatments for each lateral. In some embodiments, in multi-lateral wellbore systems, the self-degrading filter cake may be used to seal junctions. Many formations that could benefit from the implementation of multilateral well bore configurations may be limited because each lateral wellbore is often selectively stimulated to facilitate production. In some embodiments, treatment fluids of the invention can be used in the selective stimulation of multi-lateral wellbore systems.

In some embodiments, in methods employing completion fluids at least a portion of completion fluid penetrates into the subterranean formation from the uncompleted wellbore. The treatment fluid may be used to prevent further fluid loss upon introducing follow-on fluids in the completion, or the completion fluids of the invention may be used alone. Upon completion, the self-degrading particles of the filter cake may facilitate regain of formation permeability and, in some embodiments, surfactants may be used to stimulate the formation without need for a separate stimulation operation.

To facilitate a better understanding of the present invention, the following examples of preferred or representative embodiments are given. In no way should the following examples be read to limit, or to define, the scope of the invention.

EXAMPLES

This Example demonstrates that different surfactants were found to enhance the permeability of both sandstone and carbonate reservoir rocks. The microemulsion forming surfactants CFS™-559 (Halliburton, Houston, Tex.; lauryl amidopropyl betaine/butanol) and CFS™-560 (Halliburton, Houston, Tex.; lauryl amine oxide/butanol) were found to enhance the regained permeability of rocks exposed to BARADRIL-N® (acid soluble, clay-free water or brine-based reservoir drilling fluid available from Halliburton, Houston, Tex.; and BRINEDRIL-N® (high density brine-based reservoir drilling fluid available from Halliburton, Houston, Tex.) systems to 90-100% return permeability versus 75-85% without the additives. Further treatment with N-FLOW™ 325 (delayed acid cake breakers available from Halliburton, Houston, Tex.) further improved the return permeability of the cores from 95-120%. The demulsifier surfactant CFS™-461 also improved the return permeability of rocks exposed to BARADRIL-N fluid to 95% and further increases in return permeability will be seen with the application of N-FLOW™ available from Halliburton, Houston, Tex. Thus, a suite of different chemical additives can be used as stimulation while drilling additives. All surfactants employed were compatible with aqueous based drill-in and/or completion fluids to enhance oil and gas reservoirs producibility.

Further, this Example demonstrates that a drill-in fluid may be tailored to prevent formation damage mechanisms. Fluid properties such as viscosity may be engineered to minimize filtrate invasion along with the addition of acid degradable fluid loss control polymers/bridging particles. Compatibility between the drill-in fluid and formation fluids may reduce the creation of blockages from precipitates or scale. As demonstrated in this Example, a surfactant may be added to the fluid to alter the formation wettability, eliminate water blocks in gas wells or emulsion blocks in oil wells.

Windsor IV microemulsion forming surfactants (thermodynamically stable swollen micelles) may be especially effective at altering the wettability and eliminating emulsion and water blocks. Surfactants that form oil-in-water Windsor IV microemulsions aggressively water wet the formation which may eliminate water blocks and improve oil/gas transport through the formation. By being in the Windsor IV phase the continuous phase is aqueous, ensuring that the formation may remain water wet. Any oil blockages may be readily solubilized since microemulsification is a thermodynamically favored equilibrium state. Also, by forming microemulsion droplets, the viscosity of any oil-in-water emulsion may be reduced to near the continuous phase viscosity (water) possibly improving flow-back of formation fluids.

There are different damage mechanisms for gas and oil reservoirs so the regain permeability in both types of reservoirs was tested. Oil-based fluids are particularly damaging in gas wells due to wettability alteration and the low viscosity of the "produced fluid" (less than about 1 cP). Gas wells are also more affected by water blocks, requiring a wettability alteration in order to get them to produce optimally. Different lithologies can also be affected differently by certain surfactants, so both sandstone and carbonate cores were tested.

Several different surfactants were examined to test their effect on improving the regain permeability after exposure to a reservoir fluid. Two different microemulsion forming surfactants were tested:
  (A) An amine oxide: CFS™-559 (lauryl amidopropyl betaine, available from Halliburton, Houston, Tex.)
  (B) A betaine: CFS™-560 (lauryl amine oxide, available from Halliburton, Houston, Tex.).

The two fluids were tested when combined with either alcohol or pyrrolidone at various compositions. The fluids were found to efficiently solubilize various base oils, as indicated in Table 1. This efficiency at solubilizing hydrocarbon and internalizing it as a Windsor IV microemulsion (i.e. swollen micelles) is a significant factor in eliminating emulsion blockage and water wetting the formation (i.e. improved production).

TABLE 1

|  | Volume Solubilized (mL) | | | |
| --- | --- | --- | --- | --- |
|  | Diesel | XP-07 | ESCAID110 | ACCOLADE |
| Amine oxide:pyrrolidone (1:1) | 0.7 | 0.6 | 0.6 | 0.6 |
| Amine oxide:butanol (2:1) | 0.9 | 0.7 | 0.8 | 0.7 |
| Amine oxide:butanol (1:1) | 0.4 | 0.4 | 0.4 | 0.4 |
| Betaine:butanol (1:1) | 0.7 | 0.7 | 0.7 | 0.5 |

The surfactant formulations were believed to have similar effects as the Production Enhancement product GASPERM 1000® available from Halliburton, Houston, Tex. GASPERM 1000® is a pre-formed solvent in water microemulsion used to eliminate water blocks when fracturing gas wells. To compare the formulations in this Example to GASPERM 1000®, regain gas permeability testing was performed using a 150 µD Crab Orchard Sandstone core to simulate a tight gas formation. The testing was performed as follows: (i) An initial permeability was found by running $N_2$ through a dry core; (ii) the core was then saturated with 3 wt-% KCl brine neat or with 2 gpt of the additive in brine; and (iii) $N_2$ was then run through the core to determine the regain permeability.

CFS™-559 available from Halliburton, Houston, Tex., CFS™-560 available from Halliburton, Houston, Tex., GASPERM1000® available from Halliburton, Houston, Tex., and MA-844 (a GASPERM® alternative available from CESI Chemical, Marlow, Okla.) were tested for comparison. CFS™-559 and CFST™-560 outperformed the GASPERM® products by over 40% leading to 100% regain permeability, as indicated in Table 2.

TABLE 2

| | Regain Permeability (%) |
|---|---|
| CFS-559 | 100% |
| CFS-560 | 100% |
| GASPERM1000 ® | 57% |
| MA-844 | 40% |
| KCl | 30% |

The core saturated in the KCl brine alone suffered severe damage (-70% permeability) due to water blocks. Gas permeability was greatly affected by capillary pressure and water spanning across the throat of the pores, as is evidenced by the major loss in permeability when soaking the core in just brine. By adding a surfactant or surfactant/solvent combination, gas/water interfacial tension was reduced and the surfactant helped water wet the pore throat surface. This lead to spreading, eliminating water blocks, which leads to higher gas production. Due to the low viscosity of air, achieving high regain permeabilities for gas flow in water saturated cores may be difficult. The results disclosed herein demonstrate the potential for CFS™-559 and CFS™-560 as a stimulation additives.

Oil return permeability testing was performed to further investigate the potential of these additives to improve the regain permeability of the producing formation after drilling. The effect of the additives on both sandstone and carbonate cores in a range of permeabilities was examined. Exposure to both BARADRIL-N® available from Halliburton, Houston, Tex. and BRINEDRIL-N® available from Halliburton, Houston, Tex. was also examined to test the suitability of the surfactants to use in both mono- and di-valent brines. For the majority of the testing a general BARADRIL-N® formulation was selected as indicated in Table 3.

TABLE 3

9.5 ppg BARADRIL-N ® NaCl/KCl

| Component | Amount |
|---|---|
| Water | 0.913 bbl |
| KCl | 20 ppb |
| NaCl | 59 ppb |
| BARA-DEFOAM ® | 0.175 ppb |
| N-VIS ® | 1.25 ppb |
| N DRIL ® HT PLUS | 6 ppb |
| BARABUF ® | 1 ppb |
| BARACARB ® 5 | 32 ppb |
| BARACARB ® 25 | 8 ppb |

BARA-DEFOAM® products available from Halliburton, Houston, Tex. that are interchangeable include BARABRINE DEFOAM available from Halliburton, Houston, Tex., BARA-DEFOAM 1 BARA-DEFOAM W300 available from Halliburton, Houston, Tex., and BARA-DEFOAM HP available from Halliburton, Houston, Tex. N-VIS® products available from Halliburton, Houston, Tex. that are interchangeable include N-VIS® L available from Halliburton, Houston, Tex., N-VIS® P PLUS available from Halliburton, Houston, Tex., BARAZAN available from Halliburton, Houston, Tex., and BARAZAN PLUS available from Halliburton, Houston, Tex.

Formulation of Monovalent Drill-in Fluid:

A base fluid was formulated using this specific formulation and 0.5-1 volume-% was replaced with the different stimulation surfactants that were investigated. All fluids were hot rolled for 16 hours at 150° F. and allowed to cool to room temperature before being used to build filter cake. The addition of such low volume-% of surfactants to the overall fluid formulation caused little or no change to the fluid properties as evidenced in Table 4 that shows the rheological properties of drill-in fluids with and without (neat) surfactant additives.

TABLE 4

| Properties | Neat | CFS ™-560 |
|---|---|---|
| 600 | 51 | 52 |
| 300 | 39 | 39 |
| 200 | 33 | 34 |
| 100 | 26 | 28 |
| 6 | 11 | 12 |
| 3 | 9 | 10 |
| PV | 12 | 13 |
| YP | 27 | 26 |
| 10 sec | 10 | 10 |
| 10 min | 11 | 12 |

The Plastic Viscosity (PV) and Yield Point (YP) were determined on a direct-indicating rheometer, a FANN 35 rheometer, powered by an electric motor. The rheometer consists of two concentric cylinders, the inner cylinder is called a bob, while the outer cylinder is called a rotor sleeve. The sample is placed in a thermostatically controlled cup and the temperature of the fluid is adjusted to 120 (.+–0.2)° F. The fluid in the thermostatically controlled cup is then placed in the annular space between the two concentric cylinders of the FANN 35. The outer cylinder or rotor sleeve is driven at a constant rotational velocity. The rotation of the rotor sleeve in the fluid produces a torque on the inner cylinder or bob. A torsion spring restrains the movement of the bob, and a dial attached to the bob indicates displacement of the bob. The dial readings are measured at different rotor sleeve speeds of 3, 6, 100, 200, 300 and 600 revolutions per minute (rpm).

Generally, Yield Point (YP) is defined as the value obtained from the Bingham-Plastic rheological model when extrapolated to a shear rate of zero. It may be calculated using 300 rpm and 600 rpm shear rate readings on a standard oilfield rheometer, such as a FANN 35 or a FANN 75 rheometer. Similarly, Yield Stress or Tau zero is the stress that must be applied to a material to make it begin to flow (or yield), and may commonly be calculated from rheometer readings measured at rates of 3, 6, 100, 200, 300 and 600 rpm. The extrapolation may be performed by applying a least-squares fit or curve fit to the Herchel-Bulkley rheological model. A more convenient means of estimating the Yield Stress is by calculating the Low-Shear Yield Point (LSYP) by the formula shown below in Equation 2 except with the 6 rpm and 3 rpm readings substituted for the 600-rpm and 300-rpm readings, respectively. Plastic Viscosity (PV) is obtained from the Bingham-Plastic rheological model and represents the viscosity of a fluid when extrapolated to infinite shear rate. The PV is obtained from the 600 rpm and the 300 rpm readings as given below in Equation 1. A low PV may indicate that a fluid is capable of being used in rapid drilling because, among other things, the fluid has low viscosity upon exiting the drill bit and has an increased flow rate. A high PV may be caused by a viscous base fluid, excess colloidal solids, or both. The PV and YP are calculated by the following set of equations:

$$PV = (600 \text{ rpm reading}) - (300 \text{ rpm reading}) \quad \text{(Equation 1)}$$

$$YP = (300 \text{ rpm reading}) - PV \quad \text{(Equation 2)}$$

More particularly, each of these tests were conducted in accordance with standard procedures set forth in Recommended Practice 13B-2, Recommended Practice for Field Testing of Oil-based Drilling Fluids, Fourth Edition, American Petroleum Institute, Mar. 1, 2005, the contents of which is hereby incorporated herein by reference.

The formation damage caused by the fluids was tested using the Automated Return Permeameter (ARP) using a variety of different cores. The testing procedure was as follows: (I) Core: (a) Drill A 1.5 inch diameter, greater than 2 inch length core was drilled from either sandstone or carbonate core samples; (b) The cores were dried for greater than about 16 hours in an oven at about 215° F.; (c) The weight, diameter and length for dry core was obtained; (d) the dried core was saturated in 5 wt-% NaCl under vacuum for about 2 hours; (e) the core was further soaked for about 16 hours in 5 wt-% NaCl; (f) the weight of saturated core was obtained; (g) pore volume was calculated based on the dry and saturated weights; (II) Oil premeability testing: (a) the brine saturated core was loaded into ARPII; (b) the confining pressure was raised to 1000 psi and temperature to 200° F.; (c) SOLTROL® available from Chevron Phillips Chemical Company, The Woodlands, Tex., was flowed at 4 mL/min until permeability was stable; (d) the damaging fluid was displaced to the face of the core; (e) damage was run with 500 psi of differential pressure for 2 hours using dynamic filtration; (f) Flow SOLTROL was flowed at 4 mL/min until permeability was stable; and (g) the permeability difference was recorded as regain permeability; and (III) Acidizing: (a) damage core was retained in holder at temperature and pressure; (b) brine/acid generating fluid was displaced to the face of the core; (c) about one pore volume was squeezed in at a differential pressure of 50 psi using dynamic filtration (d) the brine/acid mixture was allowed to soak for about 16 hours; (e) SOLTROL was flowed at 4 mL/min until permeability was stable; (f) the permeability difference was recorded with initial permeability as regain permeability The general screening only involved recording the damage from the drill-in fluid. Promising candidates were then subjected to the acidizing step when using sandstone cores. The ARPII cannot handle the large volumes of $CO_2$ that would be generated by acidzing carbonate cores.

For the initial screening tests several different surfactants were tested: (1) CFS™-599—available from Halliburton, Houston, Tex. microemulsion forming surfactant; (2) CFS™-560—available from Halliburton, Houston, Tex. microemulsion forming surfactant; (3) BARAKLEAN® DUAL available from Halliburton, Houston, Tex.—mutual solvent/surfactant; (4) GASPERM®1000 available from Halliburton, Houston, Tex.—solvent/surfactant; (5) CFS™-461 available from Halliburton, Houston, Tex.—demulsifier/water wetting agent (6) Product 6191 available from Champion Technologies—flow-back surfactant (available from Champion Technologies); AND (7) MORFLO® III—flow-back surfactant (available from Akzo Nobel).

All tests were run in duplicate at a minimum and triplicate for the three most promising candidates: CFS™-559, CFS™-560, and CFS™-461. The results for the initial screening are summarized below in Table 5 that shows the regain permeabilities of Berea sandstone cores after exposure to BARADRIL-N® residual damage.

TABLE 5

| Fluid Additive | Regain Permeability (%) |
|---|---|
| BARADRIL-N ® | 84% |
| BARADRIL-N ®/1 vol % BARAKLEAN ® DUAL | 78 |
| BARADRIL-N ®/1 vol % Product 6191 | 86 |
| BARADRIL-N ®/1 vol % CFS ™-461 | 96 |
| BARADRIL-N ®/1 vol % MORFLO ® III | 89 |
| BARADRIL-N ®/1 vol % GASPERM 1000 | 87 |
| BARADRIL-N ®/1 vol % CFS ™-559 | 103 |
| BARADRIL-N ®/1 vol % CFS ™-560 | 97 |

The average regain permeability of three tests run using the BARADRIL-N® fluid outlined above was 84% and this was the baseline used to compare the "stimulative" effect of the different fluid additives. Berea sandstone cores were drilled from the same block and had an average oil permeability of about 70 mD. GASPERM®1000, MORFLO®III and Product 6191 are all flowback surfactants to improve flow back of fracturing fluids, eliminate water blocks and water wet the formation. None of these products significantly improved the regain permeability of the drill-in fluid so they were quickly eliminated as candidates. BARAKLEAN® DUAL was investigated since it showed earlier promise in remediating damage caused by lubricants in completion brines when injected at low temperature (CW-2031). This testing was performed at 158° F. and BARAKLEAN® DUAL showed stimulation of the formation. BARAKLEAN® DUAL is a combination of mutual solvent (Musol) and non-ionic PLURONIC® surfactant, a very successful combination used for several decades for water wetting surfaces. However, ethoxylated non-ionic surfactants tend to lose effectiveness at elevated temperature (175-225° F.) and become hydrophobic, causing formation damage similar to an emulsion blockage. Because of its promise BARAKLEAN® DUAL was tested three times and was found to damage the formation in all tests performed at the 200° F. Thus, BARAKLEAN® DUAL remains an attractive option for low temperature drill-in applications but may require testing when considering higher reservoir temperatures in excess of 175° F. The three most successful candidates were identified as CFS™-461, CFS™-559 and CFS™-560, showing regain permeabilities over 10% higher than the base BARADRIL-N® fluid at 96, 97 and 103% respectively.

These three fluids were further examined to confirm the results and to test along with the application of N-FLOW™ 325 to remediate the filter cake. All three fluids not only helped the fluid produce better without remediation, they also allowed better acid contact leading to more efficient acidization. The treatment using CFS™-559 was the most successful, showing a regain permeability of 102% without treatment and a regain permeability of 120% after remediating the filter cake via acidizing with N-FLOW™ 325, as shown in Table 6.

TABLE 6

| | Regain Permeability (%) |
|---|---|
| BARADRIL-N ® | 82% |
| After N-FLOW treatment | 90% |
| BARADRIL-N ® with 1 vol % CFS-559 | 102% |
| After N-FLOW treatment | 120% |

Similar results were seen for both CFS™-560 and CFS™-461 as shown in Table 7. As indicated in Table 7, CFS™-560 increased the regain permeability to about 97% and to about 115% after treatment with N-FLOW™ 325, with both fluids performing similarly. For all three surfactants, improved regain permeability was about 10-20%. This is well outside the margin of error for return permeability testing using the ARPII (+/−5% instrument error) and by doing the tests in triplicate the error introduced by using cores from natural materials was also minimized.

TABLE 7

| | Regain Permeability (%) |
|---|---|
| BARADRIL-N ® | 82% |
| After N-FLOW treatment | 90% |
| BARADRIL-N ® with 0.5 vol % CFS-560 | 97% |
| After N-FLOW treatment | 115% |

Further testing was performed with CFS™-560 in BRINEDRIL-N® systems. The results were very similar to those seen for the BARADRIL-N® system and are shown in Table 8.

TABLE 8

| | Regain Permeability (%) |
|---|---|
| BARADRIL-N ® | 76% |
| After N-FLOW treatment | 84% |
| BARADRIL-N ® with 0.5 vol % CFS-560 | 85% |
| After N-FLOW treatment | 92% |

The effect of lubricants on return permeability after damaging was also examined using the same about 70 mD Berea sandstone cores. BAROLUBE NS™ and Radiagreen EME (Oleon) were mixed into the standard 9.5 ppg BARADRIL-N® fluid. BAROLUBE NS™ was seen to do very little to no damage when introduced to the drill-in fluid, showing a regain permeability of 79% at a 1 vol-% addition and 89% at a 3 vol-% addition. With the addition of 0.5 vol-% CFS™-560 the regain permeability was seen to be 85% at a 1 vol-% addition of BAROLUBE NS™ and 94% at a 3 vol-% addition of BAROLUBE NS™. Similar improvements were seen for CFS™-559 making it apparent that BAROLUBE NS™ in itself is not very damaging. Radiagreen EME was also seen to cause very little to no damage and the addition of CFS™-559, CFS™-560 and CFS™-461 all stimulated to regain permeability about 10-15% higher with CFS™-559 again performing the best.

Finally, the three candidate surfactants were tested on limestone (carbonate) cores from North America and the results summarized in Table 9. Due to the significantly different mineralogy, the wettability alteration of carbonates can be significantly different from that of sandstone. A tight carbonate core was used as that was the material that was available, however a core this tight would have to be fractured to produce economically. The use of a tight core showed that the additives are non-damaging even in very narrow pore spaces as those found in a 1 mD core. This result is significant as it will add increased confidence to the use of the products since their non-damaging nature has been reproduced in difficult conditions. CFS™-559 was seen to significantly increase the regain permeability of the BARADRIL-N® fluid, while CFS™-560 and CFS™-461 also showed useful increases. This core could not be treated with acidized as an excessive amount of carbon dioxide gas would be produced, damaging the instrument.

TABLE 9

| | Regain Permeability (%) |
|---|---|
| No treatment | 90% |
| CFS-559 | 104% |
| CFS-560 | 93% |
| CFS-461 | 92% |

In conclusion, the Example shows the effect of various surfactants on the producibility of various lithologies. Two Windsor IV microemulsion-forming surfactants were found to outperform many common flowback and surfactant/solvent packages currently used in completion/stimulation operations. The surfactant treatments were found to improve the producibility of both carbonate and sandstone core samples. The two treatments were also seen to greatly improve the production of both oil and gas through sandstone. The surfactants performed effectively in both mono- and di-valent brines and used the aqueous fluid filtrate to enhance the producibility of the core samples. Acidizing effectiveness also greatly improved due to the enhanced water wetting provided by the treatment. The additives also reduced the damage that commonly occurs from the addition of lubricants and corrosion inhibitors.

The exemplary drill-in and completion fluids disclosed herein may directly or indirectly affect one or more components or pieces of equipment associated with the preparation, delivery, recapture, recycling, reuse, and/or disposal of the disclosed drill-in and completion fluids. For example, the disclosed drill-in and completion fluids may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary drill-in and completion fluids. The disclosed drill-in and completion fluids may also directly or indirectly affect any transport or delivery equipment used to convey the drill-in and completion fluids to a well site or downhole such as, for example, any transport vessels, conduits, pipelines, trucks, tubulars, and/or pipes used to fluidically move the drill-in and completion fluids from one location to another, any pumps, compressors, or motors (e.g., topside or downhole) used to drive the drill-in and completion fluids into motion, any valves or related joints used to regulate the pressure or flow rate of the drill-in and completion fluids, and any sensors (i.e., pressure and temperature), gauges, and/or combinations thereof, and the like. The disclosed drill-in and completion fluids may also directly or indirectly affect the various downhole equipment and tools that may come into contact with the chemicals/ fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
    providing a drill-in fluid consisting of:
        an aqueous fluid;
        a microemulsion-forming surfactant consisting of an alkyl propoxy-ethoxysulfate; and
        a self-degradable filter cake-forming agent, the self-degradable filter cake-forming agent consisting of:
            a plurality of degradable particulates, the plurality of degradable particulates being operable to form an acid upon degradation; and
            a plurality of acid-degradable particulates;
    drilling a wellbore through a reservoir section of a subterranean formation with the drill-in fluid wherein the microemulsion-forming surfactant alters the wettability of a surrounding reservoir and forms a microemulsion in situ with hydrocarbons present in the subterranean formation;
    forming an internal filter cake within the wellbore from the self-degradable filter cake-forming agent;
    providing an in situ generated acid from at least a portion of the plurality of degradable particulates;
    allowing the in situ generated acid to interact with the filter cake so as to at least partially degrade the filter cake such that any non-degraded portion of the filter cake is removed by lift off; and
    producing a hydrocarbon gas from the subterranean formation.

2. The method of claim 1, wherein drilling a wellbore comprises drilling a multi-lateral horizontal wellbore system.

3. The method of claim 1, wherein the plurality of degradable particulates comprises an acid-generating substance selected from the group consisting of a polyester, a polylactide, a polyglycolide, a poly(e-caprolactone), a polyanhydride, a poly(orthoester), a poly(amino acid), and any combination thereof.

4. The method of claim 1, wherein the plurality of degradable particulates comprises poly(lactic acid).

5. The method of claim 1, wherein the plurality of acid-degradable particulates comprises calcium carbonate particulates.

6. The method of claim 1, wherein the drill-in fluid comprises between about 0.01 wt. % and about 20 wt. % of the surfactant.

7. The method of claim 1, wherein the drill-in fluid comprises between about 1 wt. % and about 10 wt. % of the plurality of degradable particulates being operable to form an acid upon degradation.

8. The method of claim 1, wherein the drill-in fluid comprises between about 1 wt. % and about 25 wt. % of the plurality of degradable particulates being operable to form an acid upon degradation.

9. A method comprising:
    providing a completion fluid consisting of:
        an aqueous carrier fluid;
        a microemulsion-forming surfactant consisting of an alkyl propoxy-ethoxysulfate; and
        a self-degradable fluid sealing agent, the self-degradable fluid sealing agent consisting of:
            a plurality of degradable particulates, the plurality of degradable particulates being operable to release an acid upon degradation; and
            a plurality of sized acid-degradable particulates;
    introducing the completion fluid into an uncompleted wellbore penetrating a subterranean formation wherein the microemulsion-forming surfactant alters the wettability of a surrounding reservoir and forms a microemulsion in situ with hydrocarbons present in the subterranean formation;
    forming a fluid seal within the uncompleted wellbore from the self-degradable fluid sealing agent;
    performing a completion operation in the uncompleted wellbore;
    providing an in situ generated acid from at least a portion of the plurality of degradable particulates;
    allowing the in situ generated acid to interact with the fluid seal so as to at least partially degrade the fluid seal, thereby at least partially removing the fluid seal; and
    producing a hydrocarbon gas from the subterranean formation.

10. The method of claim 9, wherein at least a portion of the completion fluid penetrates into the subterranean formation from the uncompleted wellbore.

11. The method of claim 9, wherein the plurality of degradable particulates comprises an acid-generating substance selected from the group consisting of a polyester, a polylactide, a polyglycolide, a poly(e-caprolactone), a polyanhydride, a poly(orthoester), a poly(amino acid), and any combination thereof.

12. The method of claim 9, wherein the plurality of degradable particulates comprises poly(lactic acid).

13. The method of claim 9, wherein the plurality of acid-degradable particulates comprises calcium carbonate particulates.

14. The method of claim 9, wherein the completion fluid comprises between about 0.01 wt. % and about 20 wt. % of the surfactant.

15. The method of claim 9, wherein the completion fluid comprises between about 1 wt. % and about 10 wt. % of the plurality of degradable particulates being operable to form an acid upon degradation.

16. The method of claim 9, wherein the completion fluid comprises between about 1 wt. % and about 25 wt. % of the plurality of degradable particulates being operable to release an acid upon degradation.

* * * * *